United States Patent [19]

Nobles

[11] 4,325,171
[45] Apr. 20, 1982

[54] MEANS AND METHOD FOR SEALING HEAT EXCHANGER WALLS

[75] Inventor: Elon J. Nobles, Minnetonka, Minn.

[73] Assignee: Econo-Therm Energy Systems Corporation, Minnetonka, Minn.

[21] Appl. No.: 85,225

[22] Filed: Oct. 15, 1979

[51] Int. Cl.³ .............................................. B23P 15/26
[52] U.S. Cl. ................................ 29/157.3 C; 165/159; 165/161; 29/157.4; 29/157.3 D
[58] Field of Search ................... 29/157.3 C, 157.3 D, 29/157.4, 157.3 R, 726, 157.3 B; 165/181, 161, 159; 113/1 K, 118 C, 1 C, 118 D

[56] References Cited

U.S. PATENT DOCUMENTS

| | | | |
|---|---|---|---|
| 1,083,281 | 1/1914 | Jeffreys | 165/161 X |
| 1,913,175 | 6/1933 | Summers | 165/181 X |
| 1,943,557 | 1/1934 | Ruthenberg et al. | 165/181 |
| 2,170,774 | 8/1939 | Fagan | 165/181 X |
| 2,399,484 | 4/1946 | Gunter | 165/161 |
| 2,540,339 | 2/1951 | Kritzer | 165/181 |
| 2,699,923 | 1/1955 | Walworth | 165/181 X |
| 3,295,598 | 1/1967 | Metzger | 165/172 |
| 3,780,797 | 12/1973 | Gebelius | 165/181 |
| 4,089,188 | 5/1978 | Van Laeys | 165/181 |

FOREIGN PATENT DOCUMENTS 614648  12/1948  United Kingdom ............... 165/181

Primary Examiner—Francis S. Husar
Assistant Examiner—V. K. Rising
Attorney, Agent, or Firm—Dorsey and Whitney

[57] ABSTRACT

A new type of sealing partition around heat exchanger tubes in heat exchanger walls is disclosed. A support structure is used to position and hold the tubes in place. Overlapping inserts are then inserted over the tubes adjacent the support structure and welded together to seal the heat exchanger chambers. When a heat exchanger is assembled using the invention the heat exchanger is easily and inexpensively assembled and the sealing partition in conjunction with the support structure provides structural support for the tubes and seals the chambers while allowing heat expansion and contraction of the chambers due to the varying temperatures in the heat exchanger.

32 Claims, 9 Drawing Figures

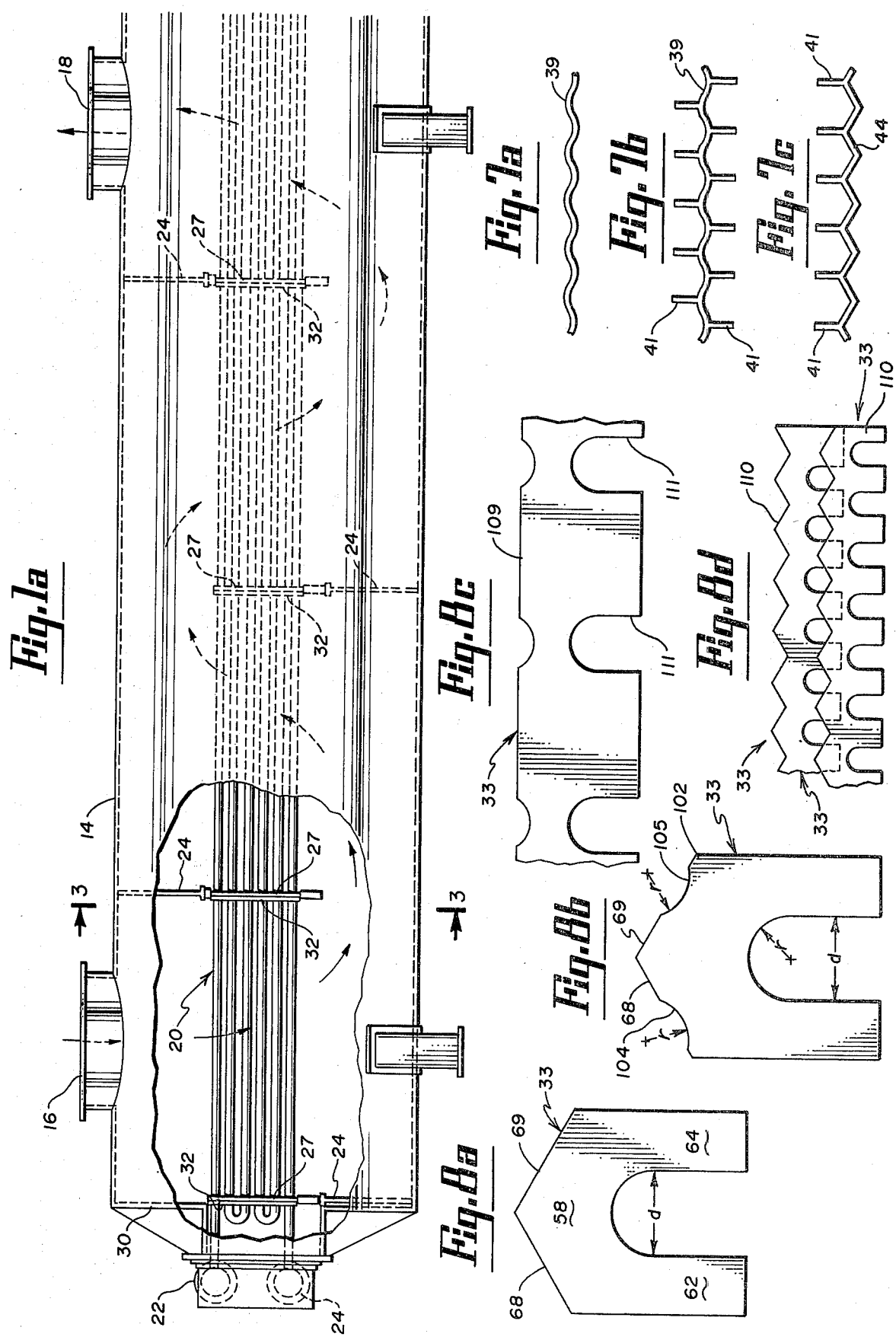

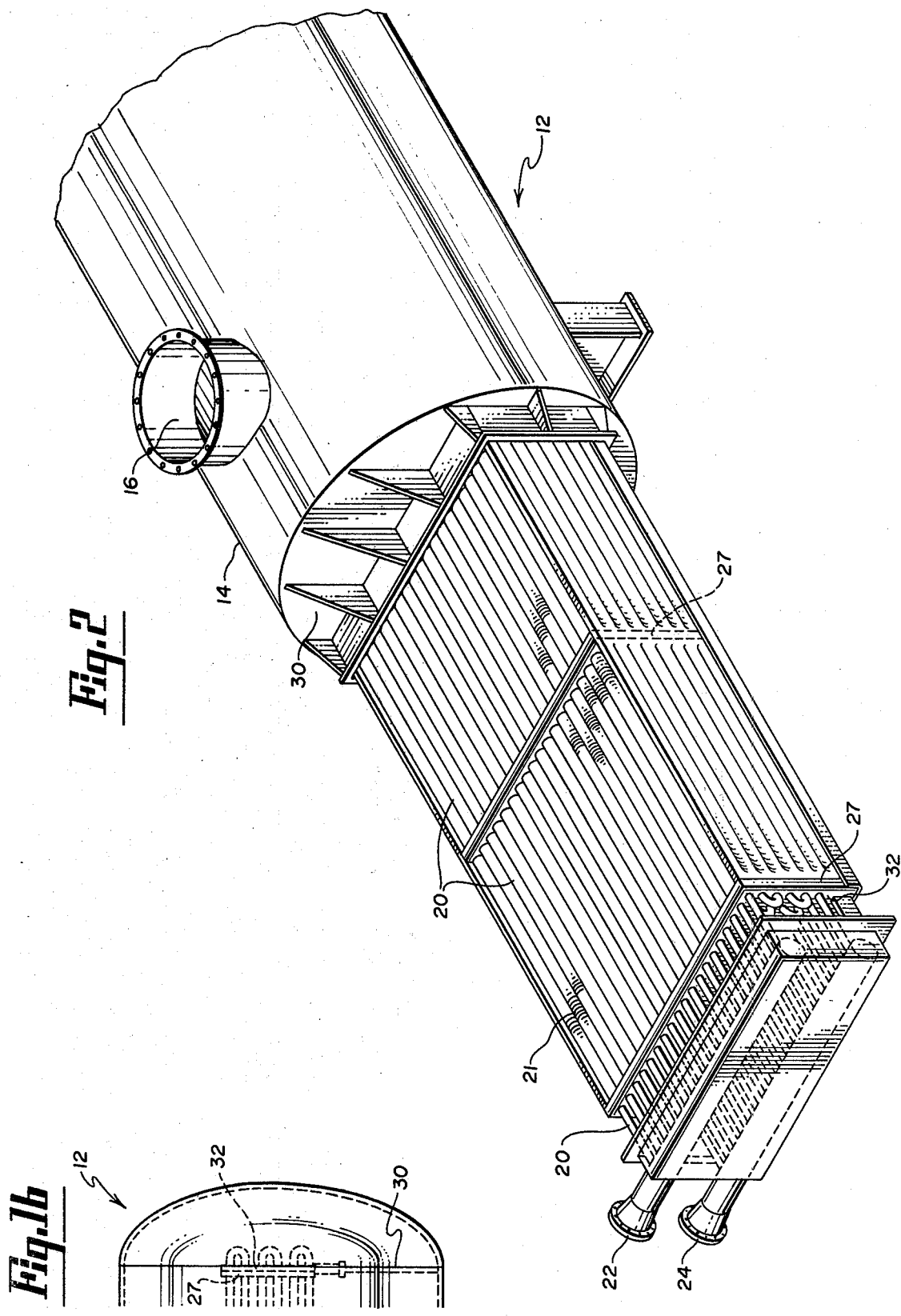

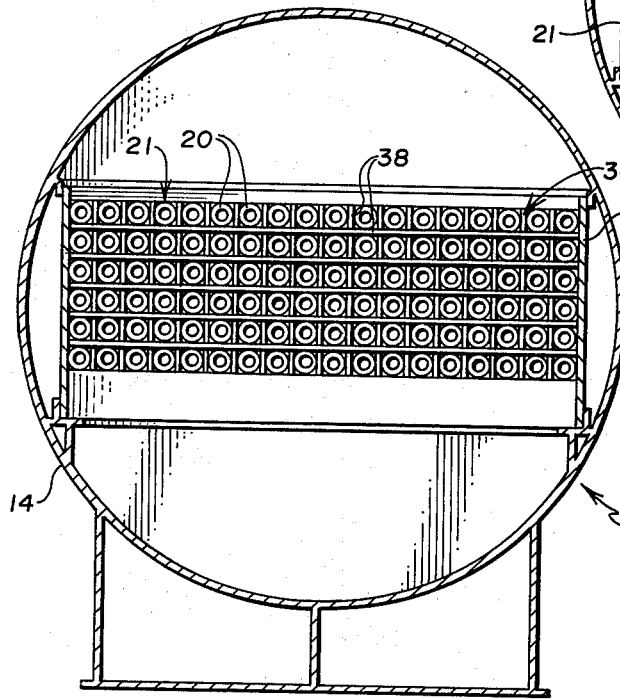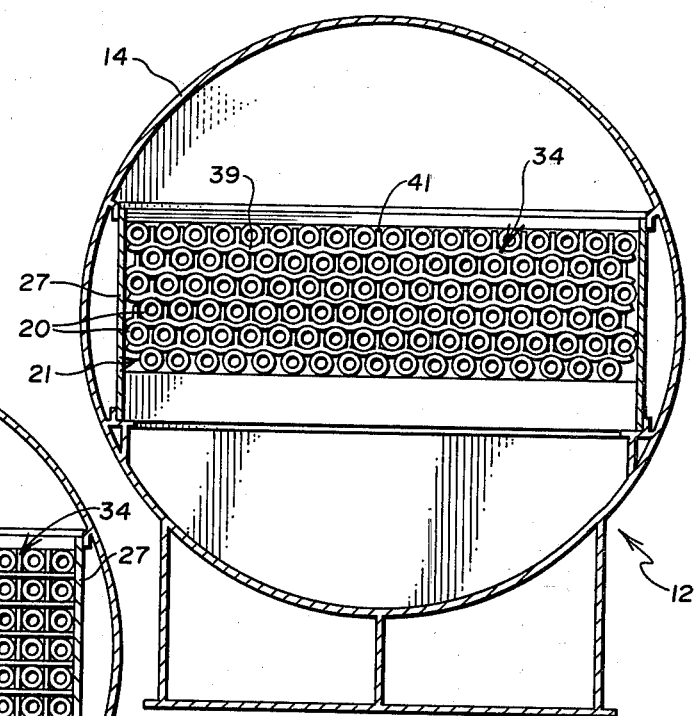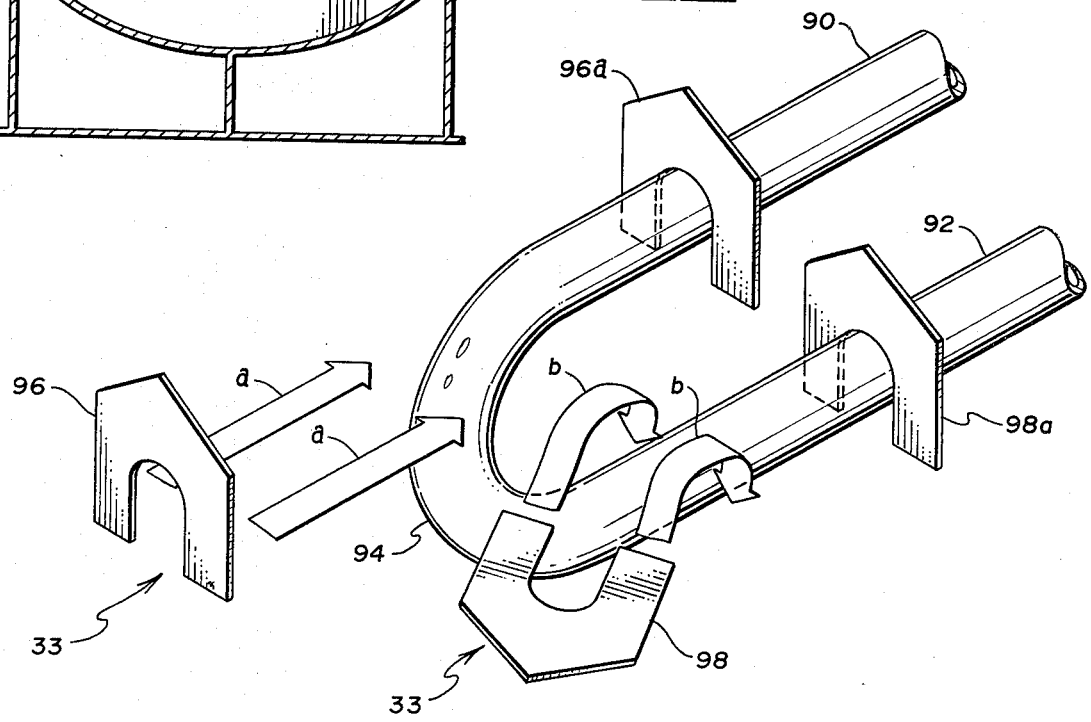

MEANS AND METHOD FOR SEALING HEAT EXCHANGER WALLS

BACKGROUND OF THE INVENTION

1. Field of the Invention

The present invention relates to heat exchanger wall construction and a means and method of sealing a heat exchanger wall around an array of heat exchanger tubes.

2. Description of the Prior Art

There are two general classes of heat exchangers in use today. In one class heat is transferred by conduction and the tubes of the heat exchanger carry both the heating or cooling fluid and the fluid to be heated or cooled. In this type of heat exchanger the tubes are soldered, brazed or otherwise attached together to form a number of tubes in a side by side relationship and heat transfer takes place between the walls of the tubes. Alternatively, in this type of heat exchanger, the tubes may be "nested" or cast in a heat transfer medium such as aluminum about and within spaces between the tubes and heat is transferred from the fluid in certain of the tubes through the transfer medium to the fluid which flows in the other tubes. This invention is not directed to this first type or class of heat exchanger.

The second class of heat exchanger in use today transfers heat by convection and employs heat exchanger tubes which are spaced apart in a heat exchanger duct or vessel. There are two types of equipment within this class referred to as tubular heat exchangers and convection sections. In this class of heat exchanger only one of the fluids is pumped through the heat exchanger tubes and the other fluid flows through and around the heat exchanger tubes to accomplish the heat transfer. It is this class of heat exchanger to which the invention is directed.

Conventionally the end walls of a tubular heat exchanger or the end walls of a convection section consist of a solid large flat plate through which a series of openings have been drilled through which the heat exchanger tubes are to pass. A ferrule encircles each tube opening and a heat-resistant refractory material is used on the interior end wall surface between the ferrules. In assembling the heat exchanger the plate is normally vertically oriented and the heat exchanger tubes are inserted one at a time prior to connection.

The diameter of the holes through which the tubes are inserted normally provides a clearance of a minimum of a quarter of an inch and, if finned tubes are used, the area for leakage around the tubes is normally greater than the inner diameter of the tube. This leakage allows a portion of the gases to bypass the heat exchanger tubes by flowing through the head box or manifold cover.

After the tubes have been inserted through the end wall of the heat exchanger a welder must connect the ends of the tubes. Since it is not economical to have the tubes extend very far past the end wall, there is only a small limited space provided for a welder to weld a return bend to the ends of the tubes or to make header to tube welds to the inlet or outlet manifolds. Since the tubes are welded in place, code position welds cannot be conveniently or quickly performed and, as a result, the welding process takes considerable time and becomes a very expensive method of construction because of the "out of position" welds.

In a tubular heat exchanger, in addition to the end walls, intermediate partition baffles are also conventionally used so that the gas in the shell can make a number of passes across the tubes. Conventionally, the portion of these intermediate partitions around the tubes consist of special support castings having heavy flanges for support which are bolted to the frame of the shell baffles. However, the holes in the castings, through which the tubes extend, also have a clearance of a minimum of one quarter of an inch, thereby permitting fluid flow around the tubes and between the partitioned sections of the heat exchanger.

SUMMARY OF THE PRESENT INVENTION

In accordance with the present invention, sealing partitions are constructed around an array of heat exchanger tubes which are in a previously fixed relationship one to the other and which have been previously welded at the ends. This method of construction permits use of efficient automatic welding of the tubes done at table height working in a clean system as each row of tubes is added. The method also involves creating a support structure which can take a variety of embodiments and which can provide both vertical and horizontal support and which can be shaped in any suitable manner to support the tubes or to support and position the tubes in the heat exchanger. Thereafter, a plurality of individual sealing plates having one or more openings which precisely correspond to the outer diameter of the tubes in the heat exchanger are fit into and over the tube array.

Intermediate partition baffles for a tubular heat exchanger are assembled a row at a time and end walls for a tubular heat exchanger or a convection section can be assembled after the entire tube bundle has been welded. The outer dimensions of the sealing plates are such that there is sufficient overlap between adjacent sealing plates so that when completed a vertical, substantially solid sealed wall is obtained. After the wall is formed of the individual sealing elements, the elements are secured together to form a continuous sealing wall with flexibility for expansion and movement. This may be accomplished by spot welding adjacent sealing elements together at edges where they overlap. Alternatively, bars can be welded to the overlapped sealing elements at regularly spaced intervals to hold the elements in a fixed and secured relationship.

By using this construction technique a flexible sealing partition can be produced around the tubes after the heat exchanger tubes have been precisely positioned in their desired location and after the tube configuration, including the headers, have been welded into place.

In addition to the simplicity of assembly and reduced cost of construction, maintenance and performance is greatly enhanced. This construction permits access to each tube for easy maintenance. And the sealing partition provides a tight seal around the circumference of each tube, measurable in thousandths of an inch, if desired.

DESCRIPTION OF THE DRAWINGS

FIGS. 1a and 1b shows a tubular heat exchanger having intermediate vessel partition baffles and end walls with which the invention can be practiced.

FIG. 2 shows a perspective view of the heat exchanger of FIG. 1 with the vessel partially broken away and with the tube bundle partially withdrawn from the shell or vessel.

FIG. 3 is a sectional view of the heat exchanger taken along the line 3—3 in FIG. 1 showing one form of the tube support means.

FIG. 4 is also a sectional view taken along line 3—3 in FIG. 1 showing an alternative embodiment of the tube support means.

FIG. 6 illustrates the method of inserting sealing elements around two heat exchanger tubes which are connected by an elbow.

FIG. 7, comprising FIGS. 7a through 7c, shows preferred embodiments of the support means to support the tubes in the heat exchanger wall.

FIG. 8, comprising FIGS. 8a through 8d, shows preferred embodiments of sealing elements which are used to seal the heat exchanger wall of the present invention.

DESCRIPTION OF THE PREFERRED EMBODIMENTS

Figure 5:
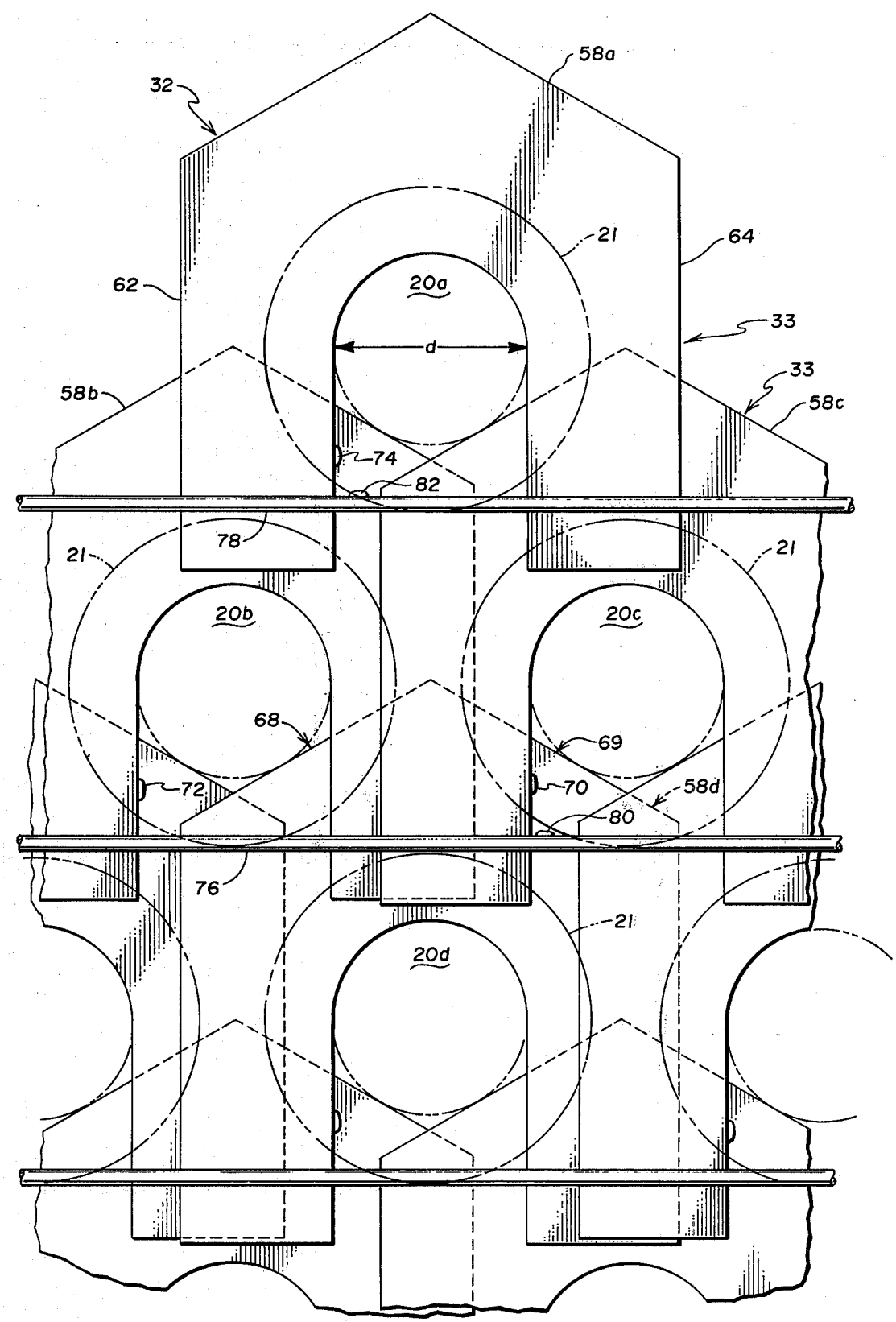
FIG. 5 is a detailed view of heat exchanger tubes over which are placed one embodiment of the sealing elements according to the present invention.

FIG. 1, in section, and FIG. 2, in perspective with the vessel 14 partially broken away and the tube bundle partially withdrawn from the vessel 14, show a tubular heat exchanger 12 in which the invention may be practiced. A tubular heat exchanger is shown in the drawing because both intermediate partition baffles are shown and used as well as end walls. It should be understood by those skilled in the art, however, that the invention is equally applicable to construction of the end walls of convection sections and the invention is directed to and is intended to cover convection sections and other types of heat exchangers which may advantageously employ the principles of the invention.

The heat exchanger 12 comprises a vessel or duct 14 with an inlet flange 16 and an outlet flange 18 through which a heated or cooled fluid may flow. In the interior of the vessel 14, along the longitudinal axis, serpentine coils of tubes 20 are arranged and connected to inlet and outlet manifolds 22, 24. It is through these tubes 20 that a liquid or gaseous fluid flows to absorb heat or contribute heat to the fluid in the tubes, depending upon the purpose to which the heat exchanger 12 is put. It is also possible, of course, to have the heated or cooled fluid flow in the tubes 20 while the heating or cooling fluid flows through the vessel 14.

In a tubular heat exchanger, for better efficiency, the fluid flowing through the vessel 14 may make a number of separate passes across the tubes 20. To achieve this efficiency, partition baffles 24 are placed at intermediate points along the vessel 14 axis and a large turn-around area for the process fluid is provided. Alternatively, the tube array may be extended throughout the interior of the vessel 14. The general flow of the fluid through the vessel 14 between the inlet 16 and outlet 18 is shown by the arrow in FIG. 1.

If the process fluid is gaseous and does not contain particulate matter, the most efficient type of tubes 20 is that conventionally referred to as "finned tubes" having metal fins 21 extending radially outward from the tube 20. These are the types of tubes 20 shown in the drawing although the invention can be practiced with conventional tubes 20 without fins 21.

As shown most clearly in FIG. 2, the end walls 30 are constructed of heavy gauge steel as part of the vessel 14. Similarly, the intermediate partition baffles 24 are also constructed as part of the vessel 14. The heat exchanger tubes 20 are contained in rectangular frames 27 which seal the tube bundle to the partition baffles 24 and to the end walls 30.

To support the tubes 20 and seal the heat exchanger walls 24, 30 within the rectangular frame 27 in accordance with the present invention the tubes 20 are first positioned and supported a row at a time with supporting means 34. The supporting means 34 can take various forms depending upon the tube 20 type and configuration. As shown in FIG. 3, finned tubes 20 are supported in an aligned configuration, referred to as a "rectangular pitch", wherein the tubes 20 are aligned vertically and horizontally. To achieve this configuration the tubes 20 are supported by a grid arrangement 34 constructed of two sets of flat or shaped steel sections 38 three-sixteenths inch to three-fourths inch thick arranged in a vertical and horizontal lattice and welded to the frame 27 providing both horizontal and vertical support and alignment. As shown, the supports 34 are constructed to support the tubes 20 at the outer diameter of the fins 21.

FIG. 4 shows another preferred embodiment of the support means 34 where a "triangular pitch" of the tubes 20 is desired, that is, each row of tubes 20 is offset from the prior row to maximize the heat transfer. Horizontal support is provided by bars of flat steel 39 which have been formed in an undulating or sinusoidal shape contoured to the outer diameter of the fins 21 or the tubes 20. The formed or shaped bar 39 not only supports the tubes 20 but also positions them in the desired location or configuration. Vertical support is also provided by vertical projections 41 welded to the tube support bar 39. As with the grid 38, the bars are welded to the frame 27.

Alternative embodiments for the tube support structure 34 are shown in FIG. 7. FIG. 7a shows a contoured bar 39 without vertical supports 41 and FIG. 7c shows a bar 44 having an angular pitch to position the tubes 20. As shown in FIG. 7b the support bars 39, 44 can utilize vertical supports 41 welded both above and below the bar 39 and with this embodiment such a bar 38, 41 would be alternated with a bar 38 having no vertical support projections.

After each row is supported with the support means the ends of the tubes are conveniently welded to the manifold header or to a return bend to an adjacent tube. This method of construction permits automatic welding without visible flash at table height in a clean environment such as with the astro arc process.

The sealing partition 32 for intermediate baffles 24 of the instant invention, if utilized, are preferably assembled after each row of tubes 20 are welded. The end wall 30 sealing partitions 32 are preferably assembled after all tubes 20 have been welded as will be discussed below with reference to FIG. 6.

The sealing partition 32 is made from a plurality of individual and overlapping sealing elements 33 which surround the tubes 20 within the frame 27 and thus seal the end walls 30 of the vessel 14, or duct if a convection section, and also seal the vessel partition baffles 24 in a shell and tube heat exchanger so that the free flowing fluid flows around the baffles 24. FIG. 5 is a sectional view showing four heat exchanger tubes 20a, 20b, 20c and 20d. Inserted over these tubes 20 are sealing elements 58a, 58b, 58c and 58d respectively, all of which have the general shape shown in FIG. 8a. The sealing element shown, 58, is a generally U-shaped member having two legs 62 and 64 extending downwardly. The inside distance between the two legs 62, 64 is the same as the outside diameter of the pipe 20 which is shown as "d" in FIG. 5. Each sealing element 58, should be wide enough to overlap adjacent sealing elements as shown, for example, in connection with tubes 20b and 20c, where the sealing elements 58b and 58c overlap. When the sealing element 58 is in its upright position, the top portion in this preferred embodiment has a triangular shape with the apex of the triangle at the center. While this leaves small gaps below the tubes 20 any leakage through the gaps is negligable compared to present designs of heat exchangers and the triangular shape is easier to construct than a wall member 58 with a sculptured top necessary to completely seal the tubes, although the latter can be accomplished readily and is an alternative embodiment 102 of the invention. The height of the sealing elements 58 is selected so that when the sealing element 58 straddles the tubes, the two top sides 68, 69 forming the triangle tangentially contact the two tubes above it. See, for example, sealing element 58d which straddles tube 20d in FIG. 5, where the two upper edges 68, 69 of the sealing element 58d are tangent to upper tubes 20b and 20c respectively. The downward length of each leg 62, 64 is also selected so that it will extend down to overlap the sealing members 58 below. Thus legs 62 and 64 of sealing member 58a extend down and overlap sealing members 58b and 58c respectively.

The individual sealing elements 58 can be assembled in various orders. One method necessary for the intermediate partitions and preferred for the end walls is to begin with the tubes 20 at the bottom of the heat exchanger 12 and proceed to insert the wall members 58 in a horizontal direction from left to right. Each successive sealing element 58 overlaps the previous one so that as one proceeds in a rightward direction, the last inserted sealing element 58 is placed in front of the sealing element previously inserted. After a horizontal row has been completed, the next horizontal row is assembled and again the sealing elements 58 can be inserted beginning from left to right. This time the bottom overlapping portion of the newly inserted elements are placed in front of the sealing elements in the row below. As seen in the detailed view in FIG. 5, sealing elements 58b and 58c are in front of the lower sealing element 58d and in turn upper sealing element 58a is in front of sealing element 58b and 58c. On the horizontal row defined by tubes 20b and 20c, sealing element 58c is placed in front of sealing element 58b.

For the end wall construction, it is also possible to insert the sealing element 58 first in a vertical direction. After completing a first vertical row, the next adjacent vertical row is assembled in an overlap fashion.

To secure the sealing elements 58 together to form a unified structure, the inner and outermost sealing elements can be tacked together by a connecting material such as a weld. In FIG. 5, these connecting points are shown at 70, 72 and 74. At the point 70, out front is the outermost sealing element 58c, underneath it at an intermediate level is the adjacent underlapping sealing element 58b and at the lowest level from the row below is the sealing element 58d. By placing a weld 70 that connects the inner leg of sealing element 58c with the front surface of the sealing element 58d, the three layers are secured together. These welds can be made under each tube 20 at the corresponding locations as further shown at points 72 and 74.

An alternative way to secure the sealing elements together is by inserting a series of rods 76, 78 across the front surface of the sealing partition 32 which are then attached to the sealing partition 32. As seen in FIG. 5, the bars 76 and 78 can be placed between each horizontal row of tubes on the front side. By placing a connecting material between the bar 76 and the sealing element, 58d, farthest removed from the bar 76, all of the overlapped sealing elements 58b–58d between the bar 76 and the back member 58d are secured together. Thus as seen in FIG. 5 by providing a tack weld 80 between the back sealing element 58d and the bar 76, the intermediate sealing elements 58b and 58c are held against bar 76 in a sandwich fashion so that the three sealing elements 58a, 58b and 58c are all secured together. A similarly positioned weld 82 is shown for upper bar 78. A further advantage of using support bars 76, 78 is for the additional structural reinforcement obtained when the two ends of the bars are secured to the frame 27. The bracing provided by these bars 76, 78 counteracts the fluid pressure being exerted against the wall 32 from the fluid being heated or cooled.

FIG. 6 illustrates a method of assembling the end walls of a convection section or shell and tube heat exchanger by inserting sealing elements 58 of FIG. 7a around the end of two tubes 90 and 92 which are connected by an elbow 94. For the upper tube 90, a sealing element 96 can be simply oriented in a vertical direction with the apex of the triangle on top and the two legs pointing down and then the member is placed over the elbow and tube and pushed back along the tube to the position 96a as shown by arrows a. For the lower pipe 92 that has the elbow 94 blocking any direct sliding insertion, the lower sealing element 98 can be tilted in a horizontal plane and angled in around the elbow 94 as shown by arrows b until it is back far enough and then the sealing element 98 can be tilted downward so that the two legs straddle over the tube 92 and the sealing element 98 is oriented in a vertical direction. Due to this ease of insertion, the partition 32 can quickly be constructed by overlaying the sealing elements associated with each tube. In the preferred insertion procedure discussed above, the lower sealing element 98 would be inserted before the upper sealing element 96.

The individual sealing elements 58 are preferably constructed of stainless steel of an adequate thickness to resist pressures in the vessel 14. For most cases, twenty-two gauge steel has been found to be sufficient.

The inside dimension of the sealing element, "d" in FIG. 5, which fits over the tube 20 is preferably cut to be as close to the diameter of the tube 20 as possible. Tolerances of approximately four thousandths of an inch are feasible for this purpose. The outside diameter of the sealing elements 33 should be sufficient to overlap adjacent sealing elements and, as indicated above, preferably contact tube surfaces above the tube over which they are inserted.

While small openings may remain beneath the various tubes 20a, 20b, 20c, 20d with the sealing elements 58 shown in FIGS. 5 and 8a and 8d, the amount of leakage through these small orifices is negligible compared to previous heat exchangers and, if desired, the tube can be entirely sealed to within four thousandths of an inch by shaping the upper edges to match the contours of adjacent tubes as shown in FIGS. 8b and 8c.

FIG. 8 shows alternative embodiments of the sealing elements which can be used when constructing a wall 32 in accordance with the present invention.

FIG. 8a is the U-shaped individual sealing element 58 discussed above.

FIG. 8b shows an embodiment of individual elements 102 which can be inserted over tubes 20 to completely seal the chamber. As with the element discussed above, the diameter "d", of the slot in the element 102 should be substantially identical to the outer diameter of the heat exchanger tube 20 and the arcuate surfaces 104, 105 machined into the upper edges 68, 69 of the sealing surface should correspond to the radial dimension of the tubes 20 with sufficient depth to seal the orifices shown in FIG. 5.

FIGS. 8c and 8d shown individual sealing elements 109, 110 constructed in strips which are useful for sealing the partition baffles and may be used for at least the last row of tubes on the end walls and for other rows if the return bend or elbow is of sufficient length to admit the strips 109, 110. As each row of tubes 20 is laid on the tube support 34 and welded together, a sealing element similar to that shown in FIGS. 7c and 7d can be inserted over all the tubes 20 or a portion of the tubes 20 for that row. Thus, if full row elements were to be used, six such elements 109 would be necessary to construct an end wall for the embodiment shown in FIG. 3 and each element 109 would have to be notched with slots 111 to accommodate eighteen tubes 20 in each row for that embodiment. The embodiment shown in FIG. 8c can be used if the tubes are arranged with a square pitch with the upper edge sealing the upper tubes and the embodiment shown in FIG. 7d can be used if the tubes are arranged in a triangular pitch.

The sealing elements 33 at the edges of the sealing partitions 32 must have sufficient width to overlap and be welded to the frame 27. The lowest row of elements 33 is preferably further sealed by a bar or strip of steel which closes the slots in the elements 33 and is also welded or otherwise fixed to the frame 27.

From a consideration of the foregoing disclosure it should be obvious that the invention is a simply constructed and economically manufactured heat exchanger wall 32 which is not susceptible to the disadvantages of the prior art and creates a partition 32 which is capable of flexing with heat expansion and contraction while providing both structural support for the heat exchanger tubes 20 and seals the vessel 14 and chambers in the vessel from gas leakage. These skilled in the art will immediately recognize that the sealing partition 32 for a heat exchanger wall of the present invention can assume embodiments other than those specifically disclosed herein without departing from the spirit of the invention. For example, a wall construction as taught by the invention would be useful in any structure which utilizes a tube bundle for any purpose. Those skilled in the art will also recognize that the various elements 33, 34 disclosed herein can assume alternative forms while remaining within the spirit of the invention. For example, the support members 34 can take a variety of shapes and forms; alternatively, the individual sealing elements 33 can assume many and varied shapes and can be interchangeably used in many heat exchangers 12.

Although several specific embodiments of the present invention have been shown, those skilled in the art will perceive further modifications other than those specifically pointed out above which can be made without departing from the spirit of the invention and it is intended by the appended claims to cover all such modifications as fall within the true spirit and scope of the invention.

I claim:

1. An end wall or intermediate baffle partition for a heat exchanger having an array of substantially regularly spaced-apart tubes extending therethrough, said partition comprising:

a plurality of individual plates, each plate having at least one slotted aperture therein having a width which corresponds to the diameter of the tubes and which extends to the edge of the plate to receive a corresponding tube and each plate having sufficient width and height to overlap adjacent plates and to cover the portions of the slots therein not occupied by the tube passing therethrough, said plates being sequentially positioned on the tubes in a plane perpendicular to the direction of the array of tubes so that each tube in the array is positioned in a corresponding aperture and the entire area between the tubes in the plane of the end wall or intermediate baffle partition is sealed by the overlapping portions of the plates.

2. The partition of claim 1 wherein an individual plate is inserted over each individual tube.

3. The partition of claim 1 wherein an individual plate is inserted over each row of tubes.

4. The partition of claim 1 wherein each individual plate is inserted over a plurality of tubes.

5. The partition of claim 1 wherein each plate has one aperture therein and the aperture is a U-shaped aperture with the legs of the U extending to the edge of the plate and having an arcuate edge as part of the aperture which is complementary to the arcuate surface of the outside of the tube over which it is inserted.

6. The partition of claim 5 wherein the legs of the U-shaped aperture in each plate extend downwardly.

7. The partition of claim 5 wherein each plate has two leg portions extending along either side of the tube, the plate having sufficient width in the leg portions to overlap the leg portions of adjacent plates and sufficient length so that the leg portions extend down to overlap the plates below.

8. The partition of claim 2 wherein the tubes are arranged in a triangular pitch and wherein each plate comprises an upper edge having two sides forming an apex at the top of the plate with both sides contacting a separate tube above the plate.

9. The partition of claim 2 wherein the tubes are arranged in a rectangular pitch and wherein each plate comprises an upper edge which contacts a separate tube above the plate.

10. The partition of claim 4 wherein each plate comprises an upper edge contacting the row of tubes vertically adjacent to the plate.

11. The partition of claim 1 wherein each plate is generally U-shaped, each plate being suspended over a separate tube with two leg portions extending along either side of the tube.

12. The partition of claim 1 wherein each plate has at least one upper edge and the upper edge contacts at least one tube in the row of tubes above the plate and wherein the portion of the upper edge which contacts the tube is arcuately shaped to the radial dimension of the tube to seal the partition.

13. The partition of claim 1 further comprising means to secure the overlapping plates together to form a unified wall structure.

14. The partition of claim 13 wherein the means to secure the overlapping plates together comprises a connecting material connecting the edge of the overlapping plates with the front surface of the overlapped plates.

15. The partition of claim 14 wherein the connecting material is a weld.

16. The partition of claim 13 wherein the securing means comprises a bar extending across the outside of the partition.

17. The partition of claim 16 wherein the bar is welded to at least one of the plates.

18. The partition of claim 1 further comprising support means adjacent to the plates to support the plurality of tubes.

19. The partition of claim 18 wherein said tubes are arranged in rows and further comprising a frame around the tubes and wherein the support means comprises a separate bar extending beneath each row of tubes which is fixedly secured at each end of the bar to the frame.

20. The partition of claim 19 wherein each bar is formed in a sinusoidal configuration to position each tube in the row of tubes that the bar supports.

21. The partition of claim 19 wherein each bar is formed in an angular configuration to position each tube in the row of tubes the bar supports.

22. The partition of claim 19 further comprising vertical support means for vertically supporting each row of tubes.

23. The partition of claim 22 wherein the vertical support means comprises vertical projections welded to each of the horizontal support bars.

24. The partition of claim 23 wherein the vertical support means extend above each bar.

25. The partition of claim 23 wherein the vertical support means extend below each bar.

26. A method of constructing an end wall or intermediate baffle partition around a plurality of rows of regularly spaced-apart tubes extending substantially normal to the plane of the partition comprising:

supporting each row of tubes;

sequentially positioning over each of the tubes, in a plane perpendicular to the longitudinal axis of the tubes, a plurality of individual plates, said plates having slotted apertures therein so that they can be so positioned and having a shape so that they overlap adjacent tubes to fill in the area in the plane between the tubes; and securing the overlapping plates together to form a unified wall structure.

27. The method of claim 26 further comprising the step of vertically supporting each row of tubes.

28. The method of claim 26 wherein the step of securing the overlapping plates together comprises the step of:

applying a connecting material between the edge of each overlapping plate to the outside surface of each overlapping plate.

29. The method of claim 26 wherein the step of securing the overlapping plates together comprises the steps of inserting at least one bar extending across the outside of the partition; and applying a connecting material to secure the bar to the outside surface of the partition.

30. The method of claim 28 or 29 wherein the connecting material applied is a weld.

31. The method of claim 26 wherein the step of sequentially positioning plates over the tubes comprises:

suspending over each tube an individual plate having an outside dimension sufficient to overlap adjacent plates.

32. The method of claim 26 wherein the step of sequentially positioning plates over the tubes comprises:

suspending an individual plate over each row of tubes with sufficient height to overlap adjacent plates.

* * * * *